United States Patent
Persson

(10) Patent No.: US 9,429,981 B2
(45) Date of Patent: Aug. 30, 2016

(54) CPU CURRENT RIPPLE AND OCV EFFECT MITIGATION

(71) Applicant: ST-Ericsson SA, Plan-les-Ouates (CH)

(72) Inventor: Håkan Persson, Newmarket (GB)

(73) Assignee: ST-Ericsson SA, Plan-les-Ouates (CH)

( * ) Notice: Subject to any disclaimer, the term of this patent is extended or adjusted under 35 U.S.C. 154(b) by 490 days.

(21) Appl. No.: 13/784,909

(22) Filed: Mar. 5, 2013

(65) Prior Publication Data

US 2014/0258765 A1    Sep. 11, 2014

(51) Int. Cl.
*G06F 1/04*    (2006.01)
*G06F 1/06*    (2006.01)
*G06F 1/10*    (2006.01)
*G06F 1/32*    (2006.01)

(52) U.S. Cl.
CPC . *G06F 1/06* (2013.01); *G06F 1/10* (2013.01); *G06F 1/3243* (2013.01); *G06F 1/3203* (2013.01); *Y02B 60/1239* (2013.01)

(58) Field of Classification Search
CPC ........................................ G06F 1/06
USPC ........................................ 713/501
See application file for complete search history.

(56) References Cited

U.S. PATENT DOCUMENTS

| | | | |
|---|---|---|---|
| 6,516,420 B1 * | 2/2003 | Audityan et al. ............ | 713/400 |
| 6,581,165 B1 * | 6/2003 | Weintraub .................... | 713/600 |
| 2004/0078613 A1 * | 4/2004 | Boerstler ................. | G06F 1/10 713/400 |
| 2004/0257137 A1 * | 12/2004 | Chang ......................... | 327/233 |
| 2006/0012416 A1 * | 1/2006 | Krasnansky ..... | H03K 19/00346 327/379 |
| 2006/0277329 A1 * | 12/2006 | Paulson ................. | G06F 5/10 710/39 |
| 2008/0141062 A1 * | 6/2008 | Yamaoka ..................... | 713/501 |
| 2008/0209251 A1 * | 8/2008 | Kottke ................ | G06F 9/30181 713/501 |
| 2008/0218225 A1 * | 9/2008 | Shibayama ............... | G06F 1/12 327/144 |
| 2008/0256382 A1 * | 10/2008 | Jacobowitz et al. .......... | 713/501 |
| 2009/0138737 A1 * | 5/2009 | Kim et al. .................... | 713/322 |
| 2009/0183019 A1 | 7/2009 | Allen et al. | |
| 2009/0249271 A1 * | 10/2009 | Yamada .............. | G06F 11/1641 716/113 |
| 2009/0265498 A1 * | 10/2009 | Yamaoka .............. | G06F 13/364 710/305 |
| 2011/0093733 A1 * | 4/2011 | Kruglick ...................... | 713/340 |
| 2013/0009687 A1 * | 1/2013 | Matsuyama et al. ......... | 327/299 |
| 2013/0039396 A1 * | 2/2013 | Kizer ............................ | 375/219 |
| 2013/0136195 A1 * | 5/2013 | Nygren et al. ................ | 375/259 |
| 2013/0162310 A1 * | 6/2013 | Doyle .................... | H03L 7/0996 327/158 |
| 2014/0159785 A1 * | 6/2014 | Conrad et al. ................ | 327/147 |

* cited by examiner

*Primary Examiner* — Thomas Lee
*Assistant Examiner* — Volvick Derose
(74) *Attorney, Agent, or Firm* — Coats & Bennett, PLLC

(57) ABSTRACT

High frequency current transients, due to logic switching inside the CPU, are reduced by applying clock signals having different relative phases to different parts of the CPU. This reduces the amplitude of current variations, and hence noise induced onto the power supply voltage. In some embodiments, different CPU cores within multi-core CPUs are clocked with a different clock phases. Additionally a method and circuit for low-latency communication in the presence of large OCV effects is provided. The low-latency communication may be based on a FIFO. Strobes are used to indicate safe points in time to update and read signals between transmitter and receiver. The strobes are generated in a central clock generation module. The strobe mechanism is used to transfer the read and write pointers between the transmitter and receiver, while the payload data is transferred using a FIFO data array that allows data writes to be asynchronous to corresponding data reads.

26 Claims, 10 Drawing Sheets

CPU CURRENT RIPPLE AND OCV EFFECT MITIGATION

FIELD OF THE INVENTION

The present invention relates to digital processing circuits, and in particular to a system and method of clocking functional units of processing circuits on different clock phases to reduce power supply current ripple, and On-Chip clock Variation mitigation circuits.

BACKGROUND

A Central Processing Unit (CPU), also known as a processor, microprocessor, controller, and the like, is a digital electronic circuit operative to execute software in the form of a series of stored instructions. A CPU, usually integrated into one or more integrated circuits, or "chips," is the "brain" of virtually all computers, as well as a vast array of electronic devices, such as cellphones, PDAs, e-readers, GPS receivers, ATMs, and the like. CPUs are integrated into vehicles and aircraft, appliances, vending machines, and industrial equipment. In short, CPUs are ubiquitous. CPUs vary in size (both physical and data word width), functionality, frequency of operation, and other parameters. CPUs deployed in portable, battery-powered devices are often designed with power-saving provisions, such as variable frequency and the ability to put one or more segments into dormant or "sleep" mode to conserve power. High performance may be achieved in some CPUs by designing two or more "cores," or computational units, into the same CPU. This achieves the processing power of two CPUs, at a reduced cost compared to two separate CPUs, by high integration and sharing many peripheral resources. Many CPUs include memory circuits integrated on-chip with the core(s), and most CPUs additionally are tightly coupled to external memory for program and data storage.

To achieve maximum performance from a given CPU, it is necessary to provide a power supply with a voltage as stable as possible. For each operating frequency, there is a corresponding minimum voltage level required of the power supply to ensure correct operation. If there is noise on the power supply, then the nominal voltage of the power supply must be increased, to ensure that the supplied voltage does not dip below the minimum required voltage. However, the power supply voltage cannot simply be raised indefinitely to reach the requirement of a particular frequency. A higher supply voltage increases the power consumption, reducing battery life (when applicable) and increasing the heat generated. Additionally, reliability concerns enforce a maximum voltage for each integrated circuit manufacturing technology Power supply noise, or high-frequency fluctuations in the ideally DC-level power supply voltage, arises from several sources. Current transients due to changes in activity on the CPU (for example when the CPU wakes up from a dormant mode due to an interrupt) can generate power supply noise. Noise may also arise from imperfections in the power supply itself, such as the ripple on a Switch Mode Power Supply (SMPS). Additionally, high-frequency current transients due to the switching of the logic inside the CPU will cause noise on the power supply voltage. In this case, the noise will have a large component with the same frequency as the CPU clock signal. However, as different instructions and data will cause slightly different patterns of logic switching, there are also lower-frequency components in the current transients generated from logic switching.

Several measures may be taken to mitigate the impact of noise on the CPU power supply. For example, the power supply network may be optimized to provide the lowest possible impedance. This may be done by optimizing the routing or power supply lines (to reduce resistance and inductance) and adding capacitive decoupling at all levels, e.g., on the PCB, on package substrate and on the silicon die. Capacitive decoupling provides a path to ground for the high-frequency noise component on the power supply lines, while isolating the DC level from ground. Transient currents may be reduced by increasing the frequency of the CPU in steps when the CPU is "awoken" from a dormant state. The CPU power supply voltage may also be monitored, and the CPU frequency reduced when the voltage falls below a predetermined threshold.

Another limitation on the CPU maximum frequency arises from On-Chip Variation (OCV). OCV refers to the variation in timing on signals—primarily digital clock signals—as they propagate across an integrated circuit. OCV limits the effective frequency by increasing defensive design parameters, such as set-up and hold times, necessary to account for uncertainty in arrival time of clock edges. OCV is particularly a problem when the source and destination flip-flops for a signal path are clocked by largely independent clock trees. The clock trees may be separate due to various reasons. High level clock gating (i.e., turning off clocks to different circuits, or to different parts of a CPU) enforces separate clock trees between regions with different clock gating conditions. Also, the level of separation of the clock tree between different flip-flops will always vary, and by necessity some paths will have largely independent clock paths.

Measures may be taken to mitigate the impact of OCV on the CPU operating frequency. One example is the use of a global clock mesh instead of a standard clock tree. However, a clock mesh dramatically increases power consumption over that of a clock tree, and is not compatible with high level clock gating or the use of separate power domains.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure is not intended to identify key/critical elements of embodiments of the invention or delineate the scope of the invention. The sole purpose of this summary is to present some concepts disclosed herein in a simplified form as a prelude to the more detailed description that is presented later.

According to one or more embodiments described and claimed herein, high frequency current transients, due to logic switching inside the CPU, are reduced. By applying clock signals having different relative phases to different parts of the CPU, the amplitude of current variations—and hence noise induced onto the power supply voltage—may be reduced. In some embodiments, different CPU cores within multi-core CPUs are clocked with a different clock phases. Additionally, according to one or more embodiments, a method and circuit for low-latency communication in the presence of large OCV effects is provided. In one embodiment, the low-latency communication is based on a FIFO. Strobes are used to indicate safe points in time to update and read signals between transmitter and receiver. The strobes are generated in a central clock generation module. The strobe mechanism is used to transfer the read and write pointers between the transmitter and receiver, while the payload data is transferred using a FIFO data array that allows data writes to be asynchronous to corresponding data reads. In one embodiment, to ensure low latency, multiple strobes and copies of read and write pointers are used.

One embodiment relates to a method of reducing transient variations in power supplied to a processor comprising a plurality of functional processing units. At least first and second clock signals are generated, the second clock signal having a phase offset relative to the first clock signal. A first functional unit of the processor is clocked with the first clock signal. A second functional unit of the processor is clocked with the second clock signal. Data transfer between the second functional unit and a circuit clocked by the first clock signal is synchronized by interposing a clock phase synchronization circuit on a data path between the second functional unit and the circuit clocked by the first clock signal.

Another embodiment relates to a processor. The processor includes a clock generator circuit operative to generate at least first and second clock signals, the second clock signal having a phase offset relative to the first clock signal. A first functional unit of the processor is clocked with the first clock signal, and a second functional unit of the processor is clocked with the second clock signal. The processor also includes a clock phase synchronization circuit interposed on a data path between the second functional unit and a circuit clocked by the first clock signal. The clock phase synchronization circuit is operative to synchronize data transfer between the second functional unit and a circuit clocked by the first clock signal.

DETAILED DESCRIPTION

Figure 1:
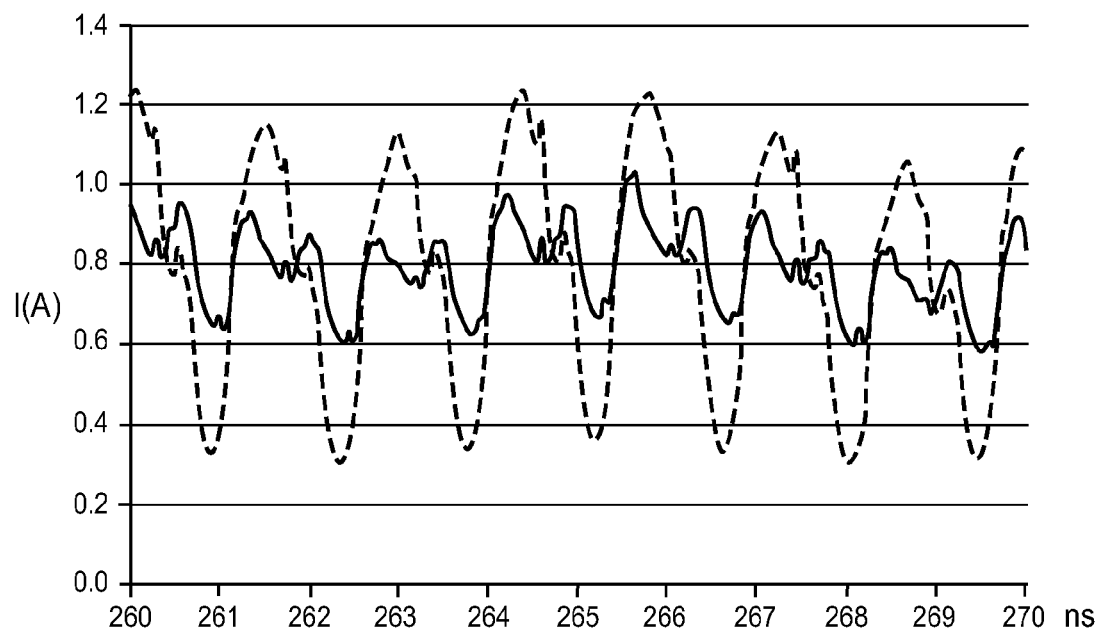
FIG. 1 is a graph depicting switching currents in a processor under different clocking conditions.

FIG. 1 is a graph of simulated switching currents in a CPU. In simulations, the CPU was clocked at 700 MHz, resulting in a 1.43 nsec cycle time. The dashed line shows the switching current. At roughly every positive edge of the CPU clock, there is a nearly 1 A surge in current, as thousands of transistors change state roughly concurrently. This switching current will induce noise on the power supply voltage, making it difficult to operate the CPU at high frequency.

The solid line in FIG. 1 is the simulated switching current when 40% of the CPU circuits are switched with a second clock signal, delayed from the first clock by 700 psec, or roughly half a cycle. The switching current exhibits a primary surge synchronous to the main clock—matching the timing of the dashed-line case, but with a much smaller magnitude (about 0.4 A). Additionally, there is a smaller, secondary current surge roughly half way through each clock cycle, caused by circuits switching due to the delayed clock signal. The overall current transients are smaller, and will cause a concomitantly smaller amount of noise on the power supply voltage.

CPU circuits are usually tightly integrated, and the entire CPU is designed to utilize the same cycle time. Hence, in practice, skewing the CPU clock phases used to clock different circuits will cause faulty operation, at least within a core.

Figure 2:
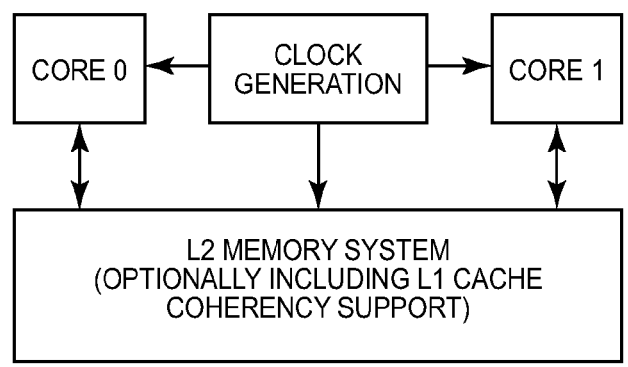
FIG. 2 is a functional block diagram of a processor having two functional units, according to the prior art.

FIG. 2 depicts the basic structure of a dual-core CPU, in which each core may include a Level-1 (L1) cache memory. Both cores interface to a Level-2 (L2) memory system, which may be structured as a larger cache, as a large virtual space, or in other ways. The L2 memory may include mechanisms to support L1 cache coherency (that is, ensuring that changes written to the L1 caches are propagated to the L2 memory, at least in the case of the other core reading data from the same address). A clock generation circuit, preferably centrally located to minimize clock skew, generates clocks for both cores and the L2 memory.

The cores may be identical, providing increased performance through parallelism. Alternately, one core may comprise a circuit dedicated to performing specific functions, such as a graphics engine, floating-point computational unit, cryptography or decompression hardware accelerator, or general-purpose DSP accelerator (e.g., the "Neon" accelerator for the ARM "A" series CPUs). In any event, when both cores are active, the overall CPU is susceptible to noise from current transients related to logic switching.

Figures 3A, 3B:
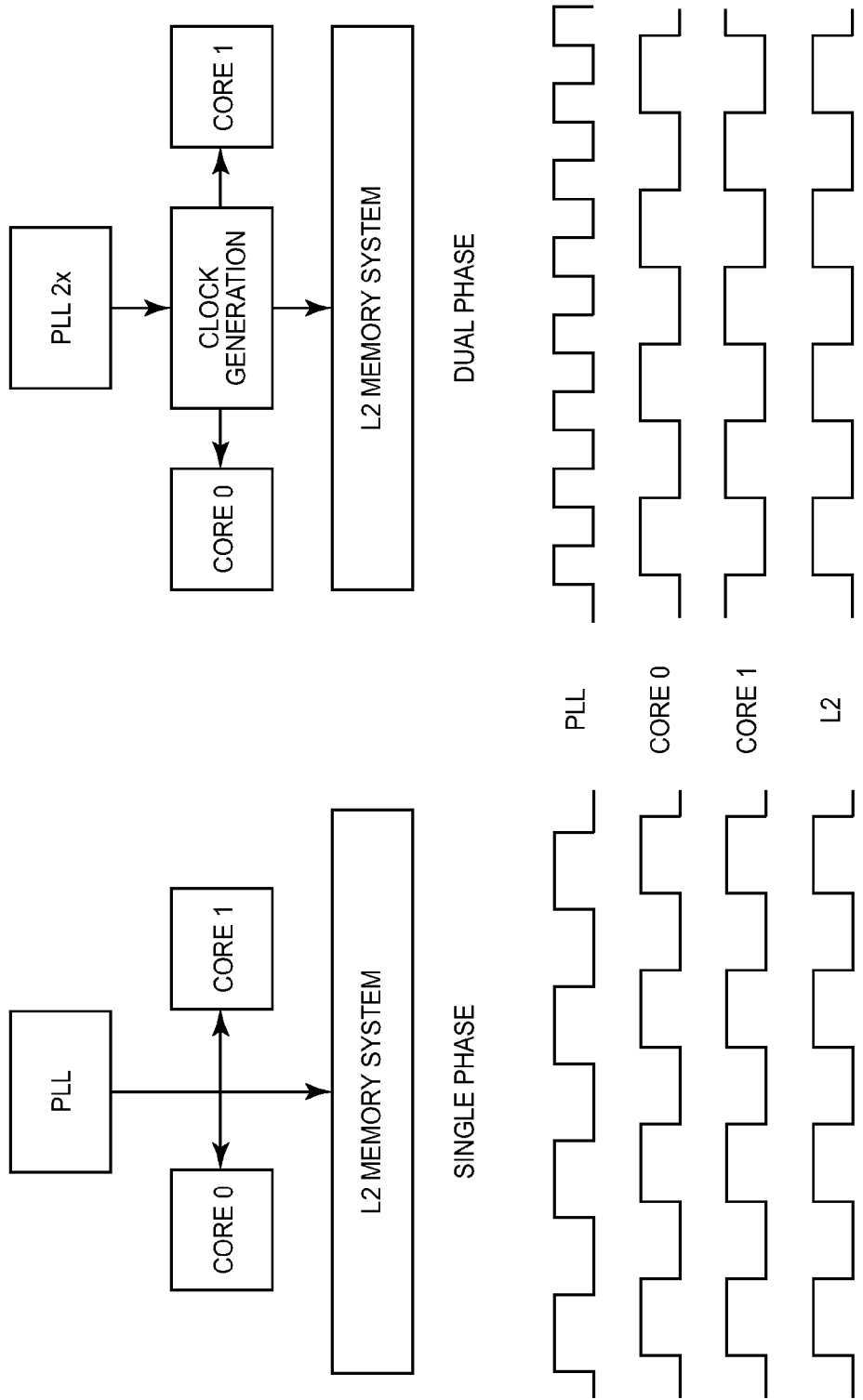
FIG. 3A is a functional block diagram of clock signal generation and distribution to a processor having two functional units, according to the prior art.
FIG. 3B is a functional block diagram of the generation and distribution of multi-phase clocks to different functional units of a processor.

FIG. 3A depicts a conventional dual-core CPU, with a Phase Locked Loop (PLL) circuit generating clock signals for the entire CPU having the same phase relationship. FIG. 3B depicts an embodiment of the present invention, wherein Core 0 and the L2 memory system are clocked with a first signal, and Core 1 is clocked with a second clock signal, 180° out of phase with the first clock signal. The first and second clocks are preferably generated from a PLL operating at twice the desired frequency. This minimizes the non-common clock path between the clocks. In other embodiments, the output of a PLL operating at the desired frequency may simply be inverted to generate the out-of-phase clock.

Changing the clock phase of Core 1 will impact the communication with the L2 memory system in several ways. The cycle behavior will differ. If no pipelining is added, then a response from the other side of the interface will appear a cycle early. If a robust handshaking protocol is used on the interface, this should not have any impact. If the same cycle behavior is required, then a single pipeline stage should be added on signals in one direction only.

Timing closure will also be more constrained in the interface between Core 1 and the L2 memory system. Only half a clock cycle will be available for signals to propagate between Core 1 and L2 memory system, rather than a full cycle. Also, since the clock tree will have a larger non-common part, On-Chip Variation (OCV) will have a larger impact.

One possibility to address the timing issues would be to implement a fully asynchronous interface between Core 1 and the L2 memory system. This would have deleterious effects on performance. Additionally, there may be reliability problems with this approach if the clocks are not fully asynchronous.

Figure 4:
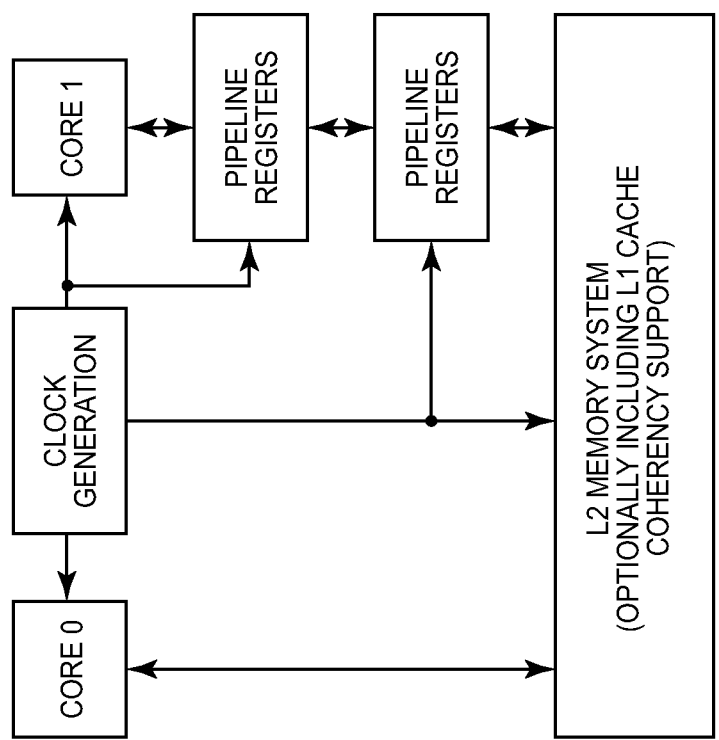
FIG. 4 is a functional block diagram of clock phase synchronization between one functional unit of a processor and memory using pipeline registers.

In one embodiment, synchronization and timing on the interface between Core 1 and the L2 memory system is met by adding pipeline stages (memory elements operative to hold signal state for one cycle) on signals in one direction or possibly both directions. In one embodiment, depicted in FIG. 4, dual pipeline stages are utilized in each direction, with one pipeline stage driven by each clock. In this embodiment, Core 0, the L2 memory system, and one pipeline stage are clocked by one phase. Core 1 and the other pipeline stage are clocked by a different phase. This will yield correct results if the Core 1/L2 memory interface has a robust handshaking protocol, such as request/acknowledge signals. In implementation, the two pipeline stages may be placed close together to minimize timing issues.

One key factor that will limit the maximum possible CPU frequency is differences in clock phase for different flip-flops due to OCV. A common way of estimating OCV during implementation is as a percentage of the non-common clock insertion latency for the source and destination flip-flops in a logic path. The simplest method uses a fixed percentage of the non-common clock insertion latency; there are also methods that adapt the percentage factor for each path by looking at the cells used in the non-common clock paths. This is then taken into account when analyzing the timing for each logic path.

The effect of OCV becomes severe when the non-common clock insertion latency becomes a large fraction of (or for very high performance CPUs, even larger than) the clock period.

Any signal that crosses between different clock phase domains will have a large non-common clock insertion latency, as the clock trees will be separate all the way to the central CPU clock generation block.

In order to allow more timing margin, it is necessary to allow key signals more than one clock period to propagate. At the same time, it is desirable to minimize additional latency as well as impact on bandwidth in the communication.

According to embodiments of the present invention, a circuit referred to as an OCV mitigation FIFO provides for a low-latency synchronization of signals and data between clock phase domains. The OCV mitigation FIFO assumes a generic handshake protocol exists between the clock phase domains. There are many possible such protocols; one commonly used is defined for the AXI bus protocol. This handshake is based on a READY signal from the destination to source and a VALID signal from the source to the destination. The READY/VALID is used herein as an example; however, the principle is easily applied to any other handshake protocol by those of skill in the art, given the teaching of the present disclosure.

Figure 5:
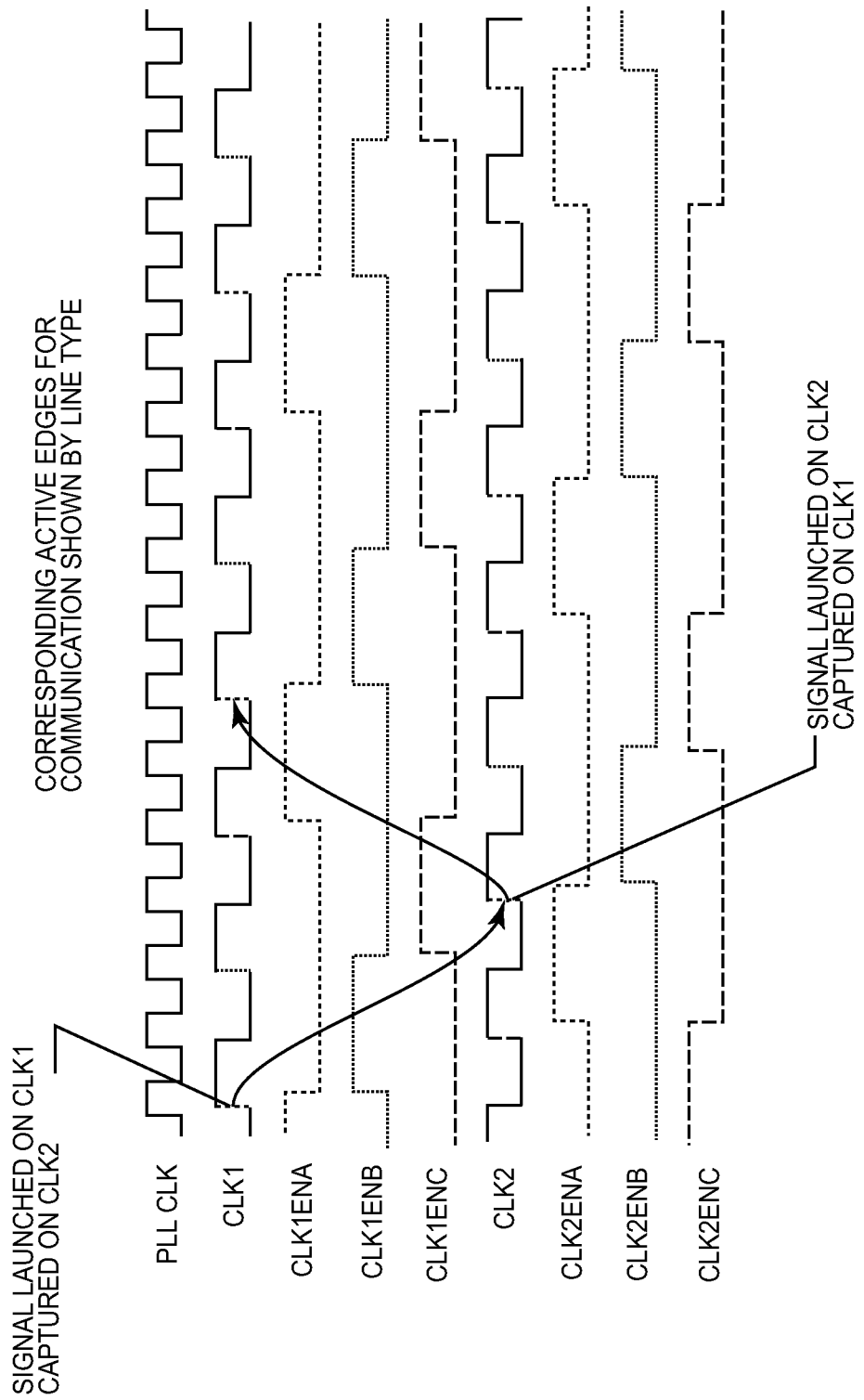
FIG. 5 is a timing diagram depicting the use of strobes to qualify corresponding cycles of clock signals having a phase offset.

The CPU central clock generation block, in addition to generating the different phase clock signals, also generates strobe signals to indicate when the multi-cycle signals can be modified. FIG. 5 depicts one example, with three pairs of strobes (each CLK1ENx/CLK2ENx comprise one pair of strobes). CLK1 and CLK2 are 180° out of phase (each generated from a 2×PLL signal), and define two clock phase domains. Signals are transferred across the domains with the use of pairs of strobe signals.

Operation of signal synchronization across clock phase domains is described with reference to the "A" strobe pair. A signal may be launched on the CLK1 rising edge (in the CLK1 clock phase domain) while the CLK1ENA strobe is asserted. The signal is captured in the CLK2 clock phase domain at the rising edge of CLK2 when the CLK2ENA strobe is asserted. The CLK1ENA/CLK2ENA strobes thus "qualify" their respective clocks, indicating the active edge of the clock on which data may be launched/latched. Similarly, a signal launched with the CLK2 rising edge when CLK2ENA strobe is asserted may be captured at a flip-flop in the CLK1 domain on the rising edge of CLK1 when the CLK1ENA strobe is asserted. The CLKnENB and CLKnENC strobe pairs operate similarly. Note that the line type (dashed, dotted) on the rising edges of the CLK1 and CLK2 signals in FIG. 5 correspond to that of the respective strobe signals.

This arrangement allows 1.5 cycles of margin for both setup and hold, with an added latency of 1 cycle. However, no additional pipeline registers should be necessary to transfer the data. Larger margins for setup and hold can be realized by using more strobe pairs. Hold margin can be added without latency penalty, but additional setup margin carries a corresponding cost in latency.

Figure 6:
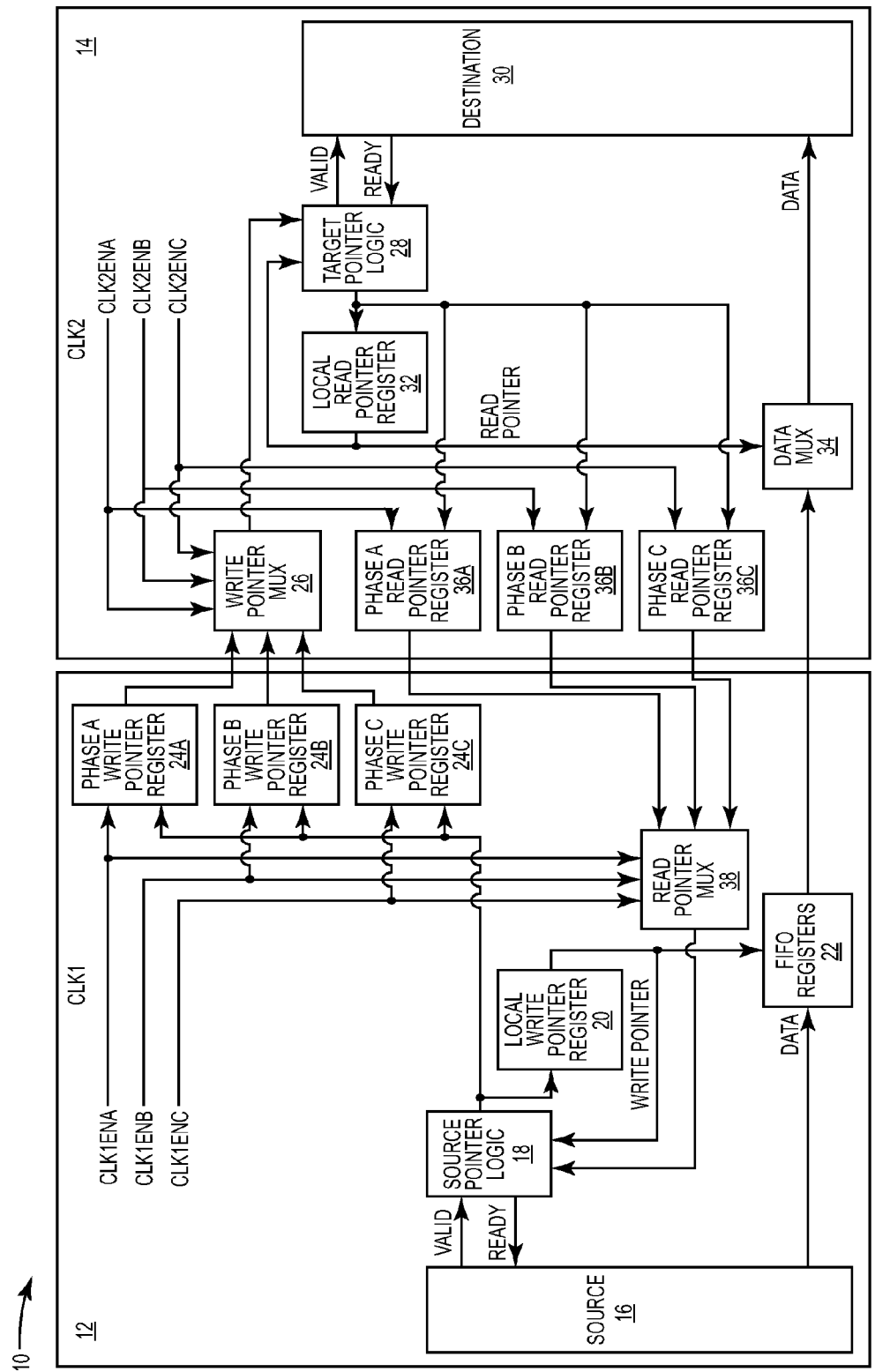
FIG. 6 is a functional block diagram of and OCV mitigation FIFO.

FIG. 6 depicts one embodiment of an OCV mitigation FIFO 10, utilizing the three strobe pairs, to bridge the CLK1 clock phase domain 12 and the CLK2 clock phase domain 14. A source register 16 engages, through representative handshake protocol READY/VALID, with source pointer logic 18. The source pointer logic 18 manages pointers into the FIFO registers 22. A local write pointer register 20 latches the current write pointer to provide a stable address into the FIFO register 22 for writing data from the source 16. The write pointers generated by the source pointer logic 18 are also latched by the phase write pointer registers 24A, 24B, 24C, each qualified by the corresponding CLK1 clock phase domain 12 strobe signal CLK1ENn.

The write pointer register 24A, 24B, 24C outputs cross over to the CLK2 clock phase domain 14, into a write pointer multiplexer 26. The select inputs to the write pointer multiplexer 26 are the CLK2 clock phase domain 14 strobe signals CLK2ENn. The selected write pointer then feeds the target pointer logic 28, which handshakes with the destination register 30 via the READY/VALID protocol. The target pointer logic 28 generates a read pointer into the FIFO registers 22, which is latched by the local read pointer register 32, providing the select input to a data multiplexer 34. The data multiplexer 34 receives the outputs of all FIFO registers 22, and selects one data word based on the local read pointer. The read pointer is also latched by the phase read pointer registers 36A, 36B, 36C. The outputs of these registers 36A, 36B, 36C cross back over to the CLK1 clock phase domain 12, into a read pointer multiplexer 26. The select inputs to the read pointer multiplexer 26 are the CLK1 clock phase domain 12 strobe signals CLK1ENn.

The write and read pointers for each strobe pair are separately registered, and provided to the opposite clock phase domain 12, 14, to support the READY/VALID handshaking protocol at the source and destination registers 16, 30. The data read at the destination 30 occurs some time after the write by the source 16. The delay is not fixed; it will depend on activity at the destination 30. The CLK2 clock phase domain 14 must be made aware of new data stored in the FIFO registers 22 in order for the target pointer logic 28 to signal to the destination register 30 that it is available (destination side VALID signal); hence, the write pointers are propagated to the CLK2 clock phase domain 14. Similarly, the READY signal generated by the source pointer logic 18 for the source register 16 should only be set if there is space in the FIFO 10; hence, the read pointers must be propagated to the CLK1 clock phase domain 12 so that the remaining space in the FIFO can be determined. Note that while the data multiplexer 34 is depicted as residing in the CLK2 clock phase domain 14 to clarify the description of its operation, in implementation, it would form the output (e.g., read selection) of the FIFO registers 22.

The handshaking protocol at both the source and destination interfaces is the same. If both the READY and VALID signals are high when an active clock edge occurs, then a data word is transferred—from the source register 16 into the FIFO registers 22 in the CLK1 clock phase domain 12, and from the FIFO registers 22 (as selected by the data multiplexer 34) into the destination register 30 in the CLK2 clock phase domain 14. Note that the multiplexers (i.e., write pointer multiplexer 26, data multiplexer 34, and read pointer multiplexer 38) must be constructed such that changes on non-selected inputs do not propagate to outputs.

The OCV mitigation FIFO 10 provides for reliable, low-latency data transfer across clock phase domains in one direction. In some implementations, a similar circuit may be utilized, if necessary, in the other direction.

CPU designs employing more than two cores usually provide for the cores to be active only as necessary—that is, they implement some form of power management by placing one or more cores in an inactive or dormant state. This adds complexity if the cores are clocked with clock signals having relative phase shifts to reduce switching current transients, as a different number of cores may be active at any given time.

Figure 7:
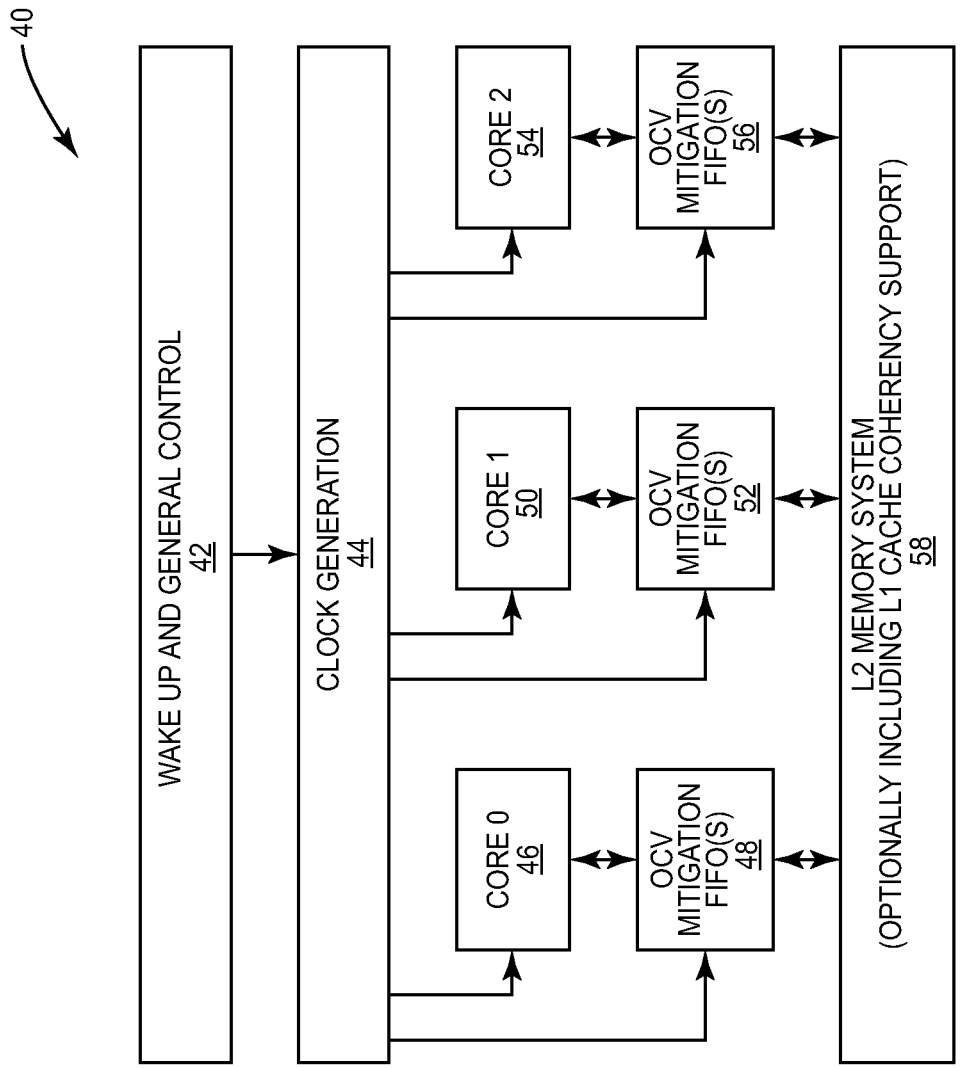
FIG. 7 is a functional block diagram of a processor having three functional units, each operative to be clocked at a different phase, and interfacing to memory via OCV mitigation FIFOs.

FIG. 7 depicts a three-core CPU 40. A power management and general control block 42 controls the activation/dormancy of the cores 46, 50, 54. A clock generation circuit 44 generates clocks as described herein and a plurality of pairs of strobe signals, as described above, for every pair of clock phases used to clock interfacing circuits. In some embodiments, the clock generation circuit 44 additionally may alter the relative phases of clock signals, in coordination with the control block 42, as cores are put to sleep and awakened. The three cores 46, 50, 54 each interface to the L2 memory system 58 via one-way or two-way OCV mitigation FIFOs 48, 52, 56. In some embodiments, each OCV mitigation FIFO 48, 52, 56 may comprise a circuit similar to the OCV mitigation FIFO 10 depicted in FIG. 6.

In one embodiment, the clock generation circuit 44 distributes clock signals having a relative phase shift of 120° to the cores 46, 50, 54 when all three cores 46, 50, 54 are active. When only two cores 46, 50, 54 are active, one core 46, 50, 54 is aligned to the L2 memory system 58 clock phase, and an offset of 180° is used for the other core 46, 50, 54 (i.e., similar to the embodiment depicted in FIG. 4). When only one core 46, 50, 54 is running, a phase shift of 180° is used in clock signals clocking the core 46, 50, 54 and the L2 memory system 58. The clock generation and control in this embodiment can be complex. Clock signals must be generated for the CPU cores 46, 50, 54 at phase offsets from the L2 memory system 58 clock of 0°, 120°, 180°, and 240°. Additionally, when one or more cores 46, 50, 54 is activated or deactivated, the relative clock phases must change in an efficient but safe manner, with a minimum of disruption (to limit spikes and valleys in the current).

In another embodiment, only a 180° phase shift is used, and the cores 46, 50, 54 are switched between the two relative phases to balance the load. As mentioned above, if only two cores 46, 50, 54 are active, the result is similar to the embodiment of FIG. 4. If all three cores 46, 50, 54 are active, then one core 46, 50, 54 is clocked with the same phase as the L2 memory system 58, and the other two cores 46, 50, 54 are clocked with a signal 180° out of phase. The clock generation and control in this embodiment is somewhat less complex than in the previous embodiment.

With shrinking feature sizes, increasing circuit integration, and dramatic increases in performance demand in small devices, it is likely that CPUs employing four or more cores will become common. When two or three of these cores are active, the clocks may be generated and distributed as describe above with reference to FIGS. 4 and 7, respectively. When four or more cores are active, it is unlikely that generating and distributing a large number of clocks, each having a fairly small relative phase offset, will reduce imbalance in switching currents sufficiently to justify the complexity of clock control and clock phase domain interfacing. In one embodiment, when four or more cores in a CPU are active, two clocks having a 180° relative phase shift are generated, and the cores (and L2 memory system) are balanced between the two clock phase domains.

Particularly at higher levels of integration, CPU cores may be heterogeneous. For example, a multi-core CPU may include one or more vector co-processors. In some cases, each standard core may have a tightly coupled vector co-processor core (e.g., ARM A9 and Neon). In other cases, one vector co-processor may be shared between two or more standard cores. Furthermore, one or more cores may comprise a special-purpose computational circuit, such as an encryption/decryption or compression/decompression engine, a graphics or video processor; or the like. In many cases, a vector co-processor or special-purpose computational circuit may consume significant power. In such cases, the core may be allocated a unique clock phase. In general, the same considerations discussed above apply for the interfaces of the vector co-processor or special-purpose computational circuit as for the standard core(s).

The power consumptions for different types of cores can vary. In this case, allocating the cores and L2 memory system to two or three clock phases becomes a bin-packing problem. Also, the power consumption for a particular core may vary over time. In one embodiment, a core computes an estimate of its power consumption based on current and past instructions, and provides this information to the clock control logic.

Figure 8:
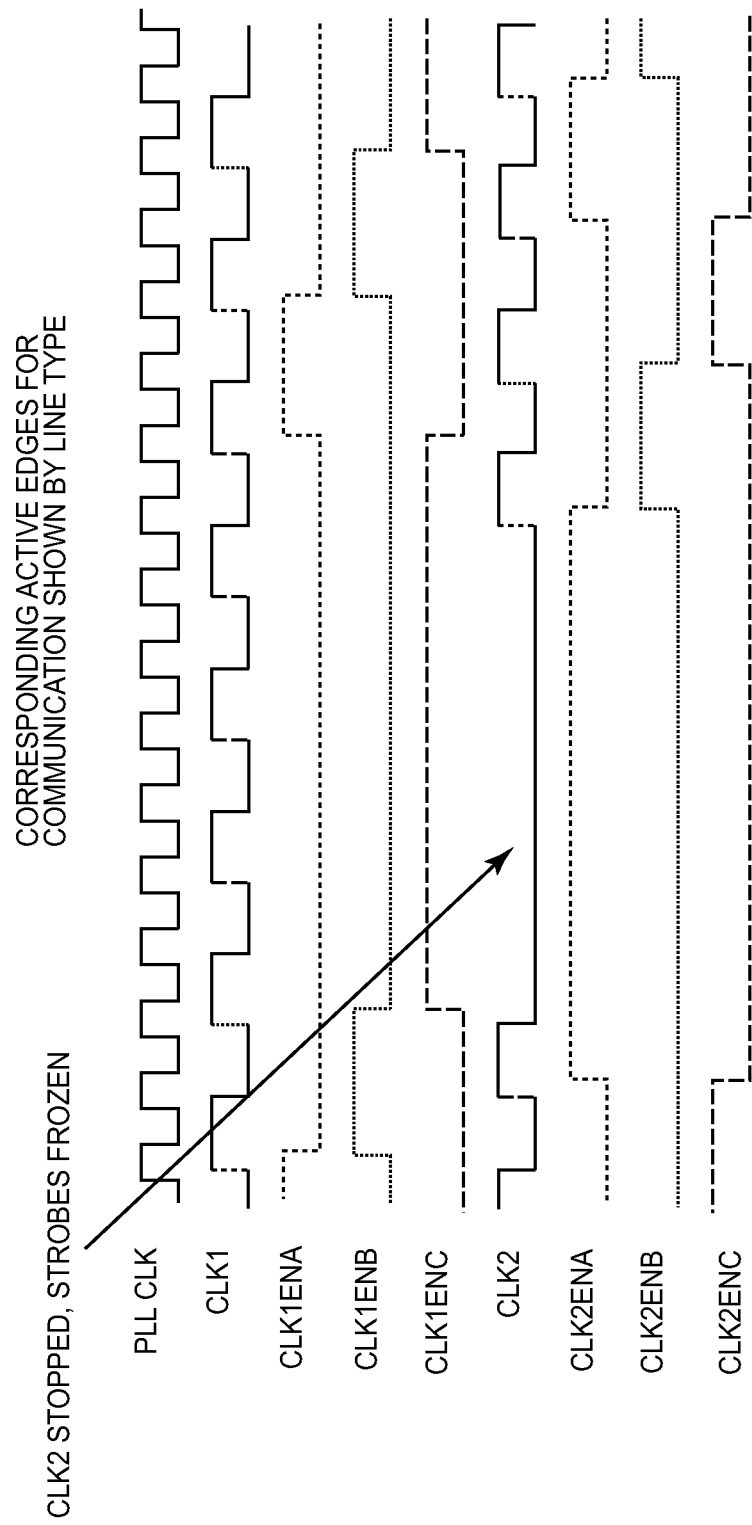
FIG. 8 is a timing diagram depicting a functional unit of a processor being disabled by stopping a clock signal.

In most systems there will be a common L2 memory system (or other common backplane) which will require a clock whenever at least one core is active. The cores will have their clocks enabled and disabled depending on their activity. In many cases (but not necessarily always) each core will communicate only with the common L2 memory system. This implies that the strobes must be frozen while a clock is stopped, in order to ensure the correct values for the read and write pointers are selected in the OCV mitigation FIFO for the clock phase domain that is still active. FIG. 8 depicts the CLK2 stopped in the low state, with the strobe signals stopped as well. Stopping the clock in a high state (or stopping CLK1) is done in a similar way. Although the example of FIG. 8 depicts a phase shift of 180°, the cases with different phase shift are similar.

In systems with more than two cores it will be necessary to dynamically change the phase of running cores as the load varies over time (i.e., when cores are entering or exiting a low power standby state). Changing the phase of a clock is done by extending either the high or low phase. A slightly more complex scheme is required to manage the strobes—the behavior is different when changing between the same and different phases (a possible third case to consider is changing between two different phases; this has some additional complexity, but is fundamentally similar, and hence is not discussed further).

The multi-cycle margin in the OCV mitigation FIFO will differ between the case of the same phase and different phase. For the representative OCV mitigation FIFO depicted in FIG. 6, with three strobe pairs, the multi-cycle margin is 1.5 cycle for each of setup and hold when using different clock phases. When using the same clock phase the total multi-cycle margin (setup+hold) remains three cycles, but must be split into two cycles for either setup or hold, and one cycle for the other. As propagation delay on the multi-cycle signals adds to the hold margin, it will usually be preferable to allocate two cycles for setup and one cycle for hold margin (an exception is if one cycle of setup margin is sufficient—in this case it is desirable to have one cycle of setup margin to minimize latency). One implication of this is that, in the case of OCV mitigation FIFOs in both directions between two clock phase domains, separate strobes will be required, and they will have different behavior.

Figure 9:
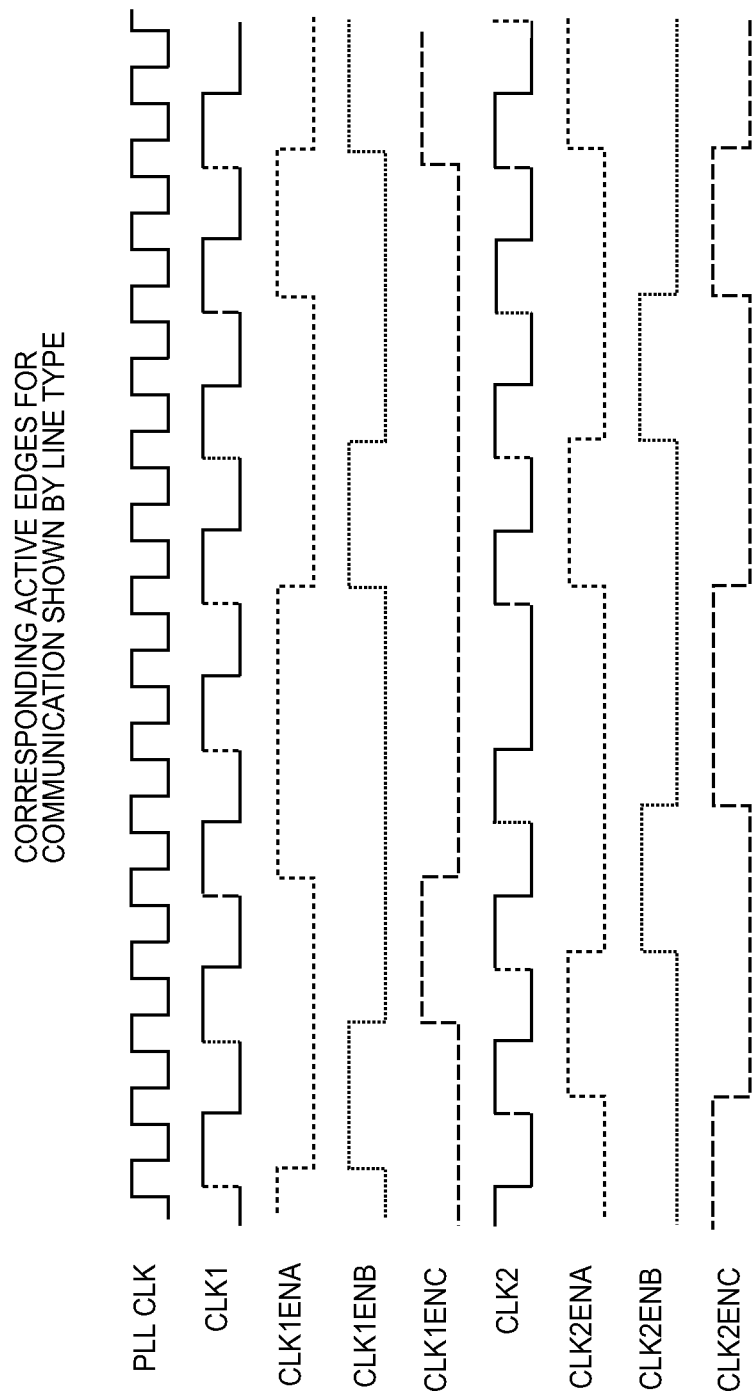
FIG. 9 is a timing diagram depicting the clock to a functional unit of a processor changing phase offset from a different phase to the same phase of a different functional unit.

FIG. 9 depicts an example in which CLK2 is changed from an opposite phase to the same phase as CLK1, allocating one cycle for setup margin. The case of allocating two cycles for setup is achieved by following the same sequence, but not extending the CLK1ENA strobe to two cycles.

Figure 10:
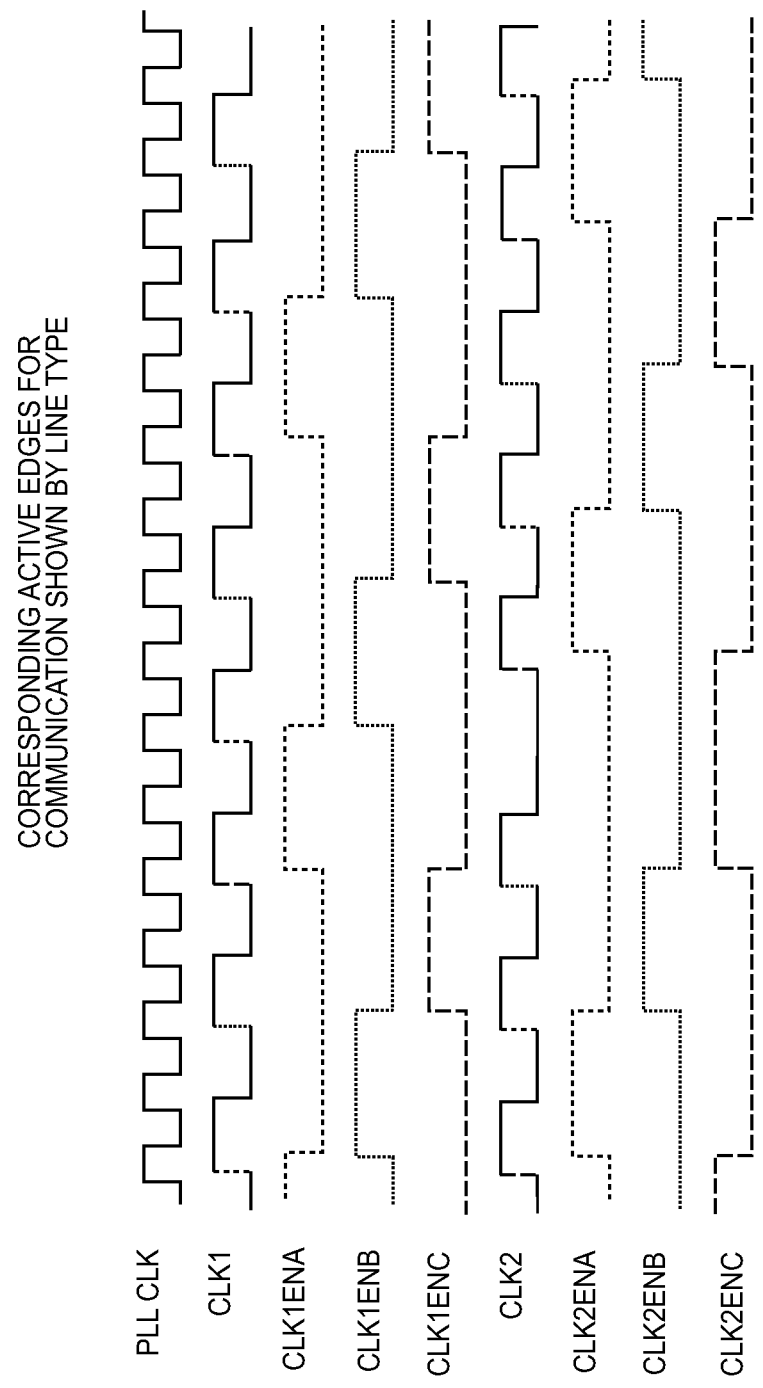
FIG. 10 is a timing diagram depicting the clock to a functional unit of a processor changing phase offset from the same phase to a different phase of a different functional unit.

FIG. 10 depicts the corresponding sequence when changing CLK2 from having the same phase as CLK1, to the opposite phase. This shows going from one cycle of setup margin to 1.5 cycles of setup margin (see CLK2ENC strobe).

Figure 11:
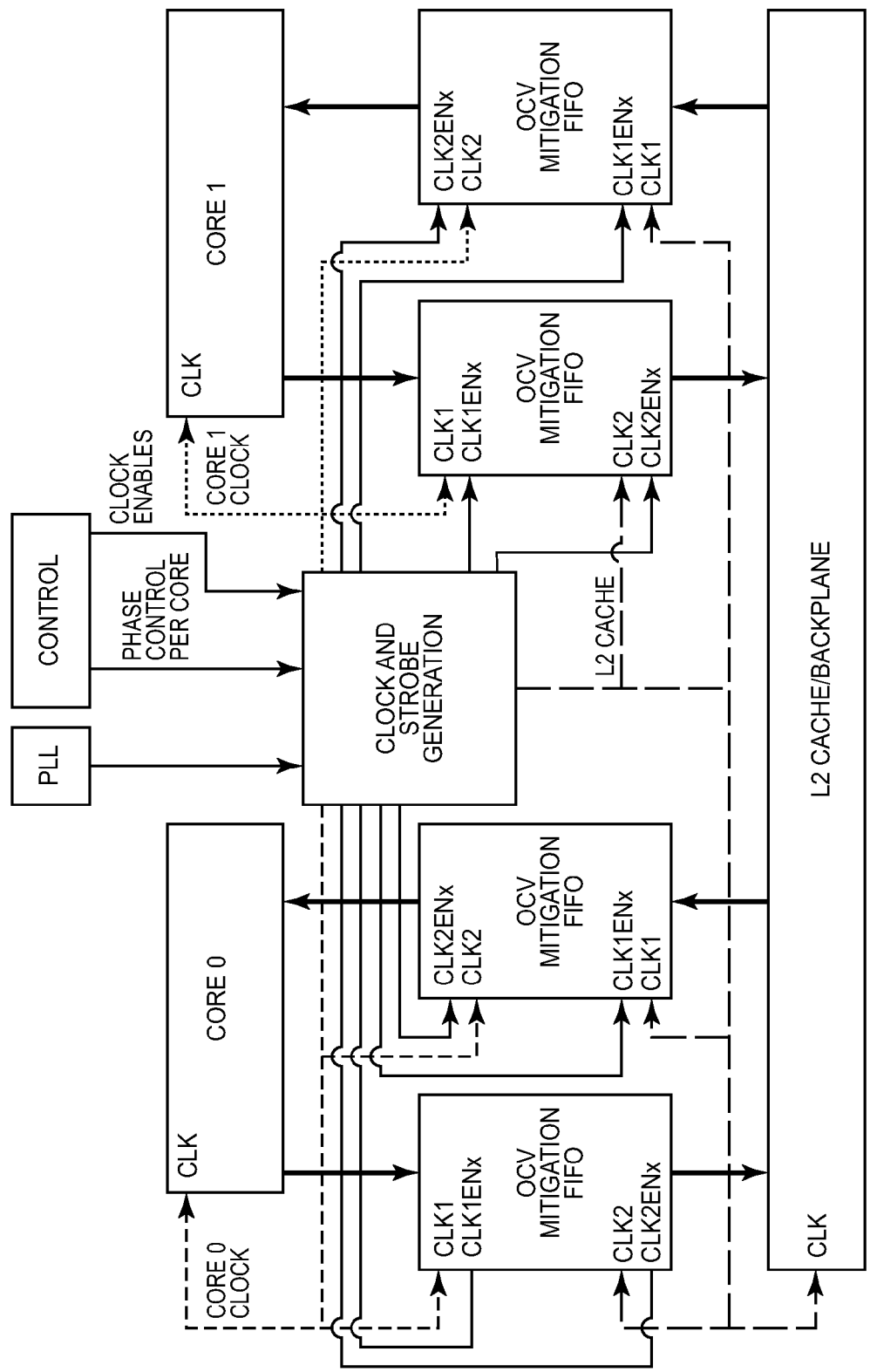
FIG. 11 is a functional block diagram of a processor having two functional units, each operative to be clocked at a different phase, and each interfacing to memory via OCV mitigation FIFOs in each direction.

FIG. 11 presents a more detailed block diagram, depicting the clocks and strobes, for a two-core CPU wherein the clock phase may be dynamically changed for each core. The basic structure is readily extensible to multiple cores.

In addition to embodiments where the OCV mitigation FIFO is used to span clock phase domains, according to one embodiment, the circuit is used in systems where the clock phases are aligned, in lieu of pipeline registers. The OCV mitigation FIFO has the advantage that timing margin is added for hold as well as for setup compared to a pipeline register. This can be useful (particularly at high frequencies) if there is a large non-common path for the source and destination clocks. In one such embodiment, a configuration has two strobe pairs.

Embodiments of the present invention reduce current transients for high speed CPUs (or other processing cores, such as graphics accelerators). This can reduce the supply voltage drops experienced. This benefit may result in either a lower supply voltage for a given operating frequency, thus saving power, or operation at a higher frequency for a given supply voltage. The OCV mitigation FIFO provides low-latency, synchronized signal transfer across clock phase domains. The OCV mitigation FIFO may additionally find utility in situations where timing closure is critical for signals crossing between two separate clock domains of the same frequency (or with a simple extension, frequencies related by an integer factor).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of reducing transient variations in power supplied to a processor comprising a plurality of functional processing units, comprising:
    generating at least first and second clock signals, the second clock signal having the same frequency, but a phase offset, relative to the first clock signal;
    clocking a first functional unit of the processor with the first clock signal;
    clocking a second functional unit of the processor with the second clock signal;
    synchronizing data transfer between the second functional unit and a circuit, other than the first functional unit, that is clocked by the first clock signal by interposing a clock phase synchronization circuit on a data path between the second functional unit and the circuit clocked by the first clock signal; and
    suspending at least one of the first and second clock signals when the associated functional unit of the processor is placed in an inactive state.

2. The method of claim 1 wherein the circuit clocked by the first clock signal comprises a memory circuit.

3. The method of claim 1 wherein the phase offset is 180 degrees.

4. The method of claim 3 wherein generating the first and second clock signals having 180 phase offset comprises inverting the first clock signal to generate the second clock signal.

5. The method of claim 3 wherein generating the first and second clock signals having 180 phase offset comprises
    generating a source clock signal at twice the desired frequency; and
    dividing the source clock signal by two to generate the first and second clock signals, each of the first and second clock signals separated by one cycle of the source clock frequency.

6. The method of claim 3 further comprising:
    clocking a third functional unit of the processor with the first clock signal;
    clocking a memory circuit connected to the processor with the second clock signal.

7. The method of claim 6 further comprising: changing the clocking of one or more functional units between first and second clock signals as one or more functional units changes between active and inactive states.

8. The method of claim 1 further comprising
    generating a third clock signals, the third clock signal having a phase offset relative to the first and second clock signals; and
    clocking a third functional unit of the processor with the third clock signal.

9. The method of claim 8 wherein the second clock signal is phase offset from the first clock signal by 120 degrees, and wherein the third clock signal is phase offset from the first clock signal by 240 degrees.

10. The method of claim 9 further comprising changing the phase offset of one or more clock signals.

11. The method of claim 1 wherein the clock phase synchronization circuit comprises one or more stages of pipeline registers.

12. The method of claim 1 further comprising:
generating a plurality of pairs of strobe signals associated with the first and second clock signals, one strobe signal of each pair being asserted to qualify a cycle of one clock signal and the other strobe signal of the pair being asserted to qualify an associated cycle of the other clock signal; and
wherein the clock phase synchronization circuit comprises an On-Chip Variation (OCV) mitigation First In First Out (FIFO) memory circuit including a separate set of read and write pointer registers associated with each pair of strobe signals, the read and write pointers operative to independently index a memory to provide FIFO functionality for each pair of strobe signals.

13. A processor, comprising:
a clock generator circuit operative to generate at least first and second clock signals, the second clock signal having the same frequency, but a phase offset, relative to the first clock signal;
a first functional unit of the processor clocked with the first clock signal;
a second functional unit of the processor clocked with the second clock signal; and
a clock phase synchronization circuit interposed on a data path between the second functional unit and a circuit, other than the first functional unit, that is clocked by the first clock signal and operative to synchronize data transfer between the second functional unit and a circuit clocked by the first clock signal;
wherein the clock generator circuit is further operative to suspend at least one of the first and second clock signals when the associated functional unit of the processor is placed in an inactive state.

14. The processor of claim 13 further comprising a memory circuit, and wherein the circuit clocked by the first clock signal comprises the memory circuit.

15. The processor of claim 13 wherein the phase offset is 180 degrees.

16. The processor of claim 15 further wherein clock generator circuit is operative to generate the second clock signal by inverting the first clock signal.

17. The processor of claim 15 further wherein clock generator circuit is operative to
generate a source clock signal at twice the desired frequency; and
divide the source clock signal by two to generate the first and second clock signals, each of the first and second clock signals separated by one cycle of the source clock frequency.

18. The processor of claim 15 further comprising:
a third functional unit clocked with the first clock; and
a memory circuit clocked with the second clock.

19. The processor of claim 18 wherein the clock generator circuit is further operative to change the clock signal applied to one or more cores in response to one or more cores changing between active and inactive states.

20. The processor of claim 13
wherein clock generator circuit is further operative to generate a third clock signal, the third clock signal having a phase offset relative to the first and second clock signals; and
further comprising a third functional unit of the processor clocked with the third clock signal.

21. The processor of claim 20 wherein the second clock signal is phase offset from the first clock signal by 120 degrees, and wherein the third clock signal is phase offset from the first clock signal by 240 degrees.

22. The processor of claim 20 wherein clock generator circuit is further operative to change the phase offset of one or more clock signals.

23. The processor of claim 13 wherein the clock phase synchronization circuit comprises one or more stages of pipeline registers.

24. The processor of claim 13 wherein
the clock generator circuit is further operative to generate a plurality of pairs of strobe signals associated with the first and second clock signals, one strobe signal of each pair being asserted to qualify a cycle of one clock signal and the other strobe signal of the pair being asserted to qualify an associated cycle of the other clock signal; and
wherein the clock phase synchronization circuit comprises an On-Chip Variation (OCV) mitigation First In First Out (FIFO) memory circuit including a separate set of read and write pointer registers associated with each pair of strobe signals, the read and write pointers operative to independently index a memory to provide FIFO functionality for each pair of strobe signals.

25. An On-Chip Variation (OCV) mitigation First In First Out (FIFO) memory circuit operative to synchronize data between clock phase domains wherein clock signals have the same frequency but different relative phases, and further operative to mitigate the effects of OCV in clock signals, comprising:
in a first clock phase domain,
inputs operative to receive a first clock signal and a plurality of first strobe signals, each first strobe signal operative to qualify a cycle of the first clock signal;
a plurality of data storage registers;
source pointer logic operative to generate write pointers into the data storage registers and to output a plurality of write pointers;
a plurality of write pointer registers, each associated with and qualified by a first strobe signal and operative to receive a write pointer from the source pointer logic and output a write pointer to a second clock phase domain of the OCV mitigation FIFO; and
a read pointer multiplexer operative to receive the plurality of first strobe signals and a plurality of read pointers from the second clock phase domain of the OCV mitigation FIFO and output an active read pointer to the source pointer logic based on the first strobe signals; and
in a second clock phase domain wherein clock signals have the same frequency as, but different relative phases than, clock signals in the first clock phase domain,
inputs operative to receive a second clock signal having a phase offset from the first clock signal and a plurality of second strobe signals, each second strobe signal operative to qualify a cycle of the second clock signal associated with a corresponding cycle of the first clock signal;

target pointer logic operative to generate a plurality of read pointers;

a plurality of read pointer registers, each associated with and qualified by a second strobe signal and operative to receive a read pointer from the target pointer logic and output a read pointer to the first clock phase domain of the OCV mitigation FIFO; and a write pointer multiplexer operative to receive the plurality of second strobe signals and a plurality of write pointers from the first clock phase domain of the OCV mitigation FIFO and output an active write pointer to the target pointer logic based on the second strobe signals; and a data multiplexer operative to receive data from the first clock phase domain of the OCV mitigation FIFO and output data based on a read pointer received from the target pointer logic.

26. The OCV mitigation FIFO of claim 25 wherein the read pointer multiplexer, write pointer multiplexer, and data multiplexer are operative to block changes on non-selected inputs from propagating to the respective outputs.

* * * * *